(12) United States Patent
Barnard

(10) Patent No.: US 6,748,854 B2
(45) Date of Patent: Jun. 15, 2004

(54) MELON CUTTER

(75) Inventor: James E. Barnard, Cincinnati, OH (US)

(73) Assignee: Display Specialties, Inc., Ft. Thomas, KY (US)

( * ) Notice: Subject to any disclaimer, the term of this patent is extended or adjusted under 35 U.S.C. 154(b) by 17 days.

(21) Appl. No.: 10/161,367

(22) Filed: Jun. 3, 2002

(65) Prior Publication Data

US 2003/0079616 A1 May 1, 2003

Related U.S. Application Data

(60) Provisional application No. 60/348,331, filed on Oct. 26, 2001.

(51) Int. Cl.$^7$ .............................. A23L 1/00; A23N 3/00; A47J 17/00
(52) U.S. Cl. ............................. 99/541; 99/537; 99/538; 99/545
(58) Field of Search ........................ 99/537–545, 547, 99/555, 556, 583, 643; 89/862, 431, 865, 857, 425.3, 425.7, 626, 732, 437.1, 437.2, 437.4, 451, 407; 30/113.1, 114; 426/302

(56) References Cited

U.S. PATENT DOCUMENTS

| | | | | | |
|---|---|---|---|---|---|
| 3,696,847 | A | * | 10/1972 | Erekson | .................... 99/545 X |
| 5,142,973 | A | * | 9/1992 | Tur et al. | ...................... 99/538 |
| 5,421,249 | A | * | 6/1995 | Repisky et al. | ............... 99/545 |
| 5,520,105 | A | * | 5/1996 | Healy | ....................... 99/545 X |

* cited by examiner

*Primary Examiner*—Timothy F. Simone
(74) *Attorney, Agent, or Firm*—Wood, Herron & Evans, L.L.P.

(57) ABSTRACT

A melon cutter includes a cutting basket which has a plurality of arched wire cutters which extend to a central member. The cutter includes a melon holder which can be forced down towards the cutting head. A melon half placed on the cutting head is then forced by the holder down against the cutting elements. The cutting basket is then rotated about 30°–45° to effectively separate melon meat from the melon rind. The melon pieces then fall into a bowl below the cutting basket.

10 Claims, 5 Drawing Sheets

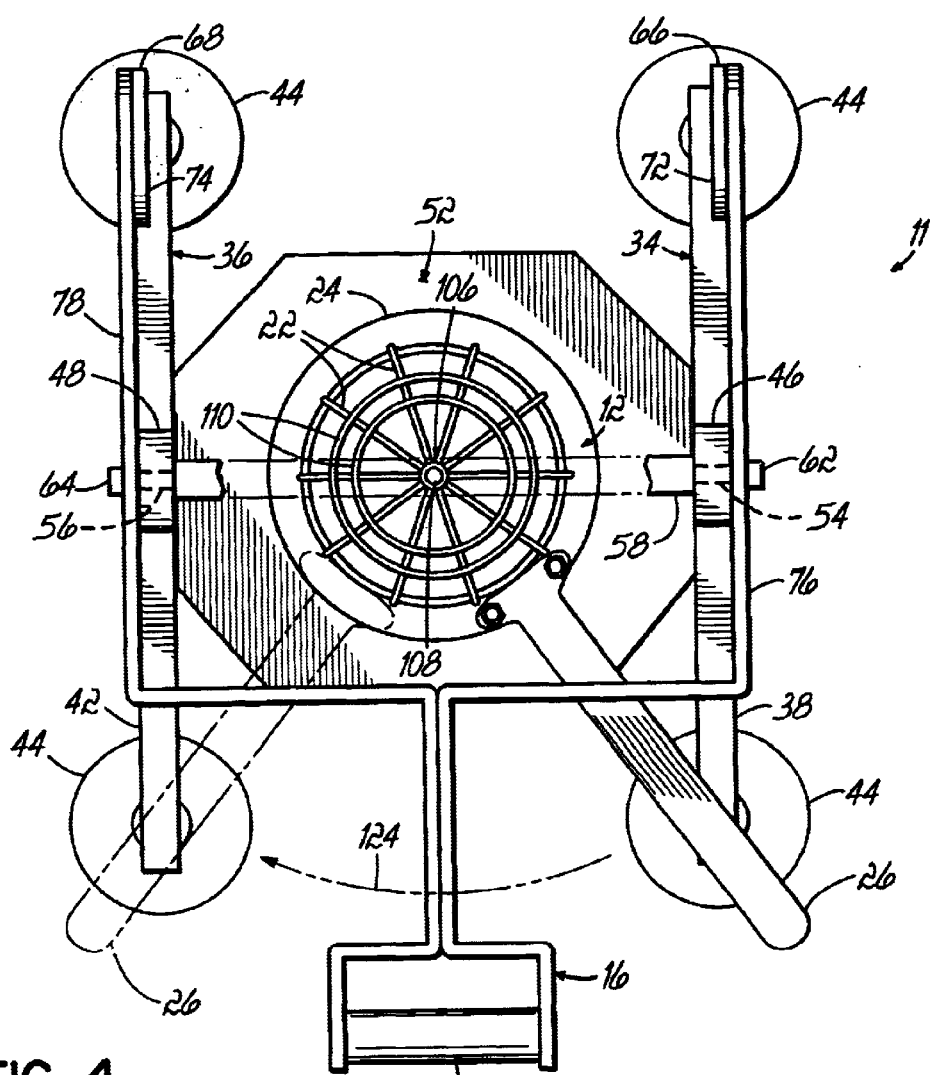
FIG. 4
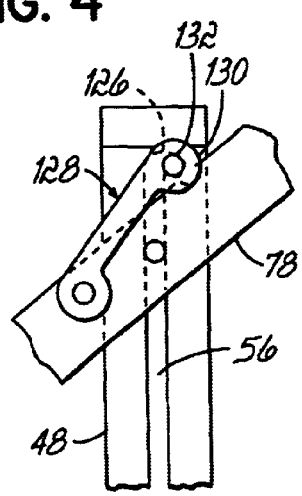
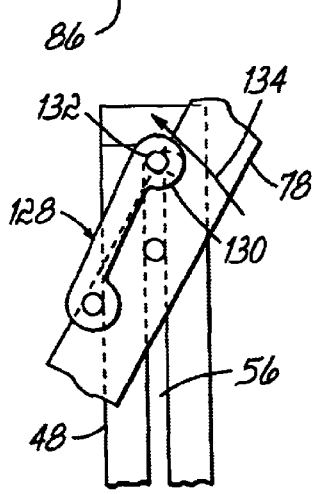
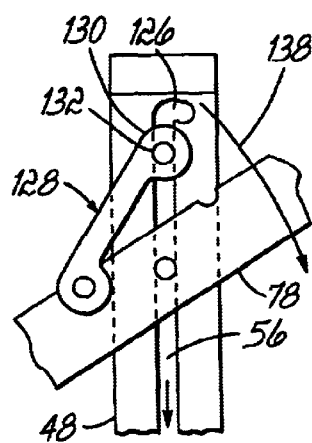
FIG. 6A  FIG. 6B  FIG. 6C

MELON CUTTER

This application claim the benefit of U.S. Provisional Application Serial No. 60/348,331, filed Oct. 26, 2001 entitled "Melon Cutter" which is now pending.

BACKGROUND

Melons such as cantaloupes and honey dew melons and the like can be served in portions with the rind still attached or can be separated from the rind. In separating the melon meat from the rind one generally cuts the melon in half removing the seed and pulp. The melon is then cut into wedges. The meat is then cut from the wedges and can be further cut into small cubes. This is relatively time-consuming particularly for restaurants grocery delis and the like which require a large amount of fresh melon.

Accordingly it is the object of the present invention to provide a device adapted to quickly and simply separate the melon meat from its rind. More particularly it is the object of the present invention to do this with minimal effort and preferably at the same time separate the meat into smaller pieces.

SUMMARY OF THE INVENTION

The present invention is premised on the realization that a melon cutter which utilizes a cutting basket having a melon holder wherein the basket penetrates the meat of the melon and rotates relative to the melon, separates the melon meat from the rind quickly and efficiently. In a preferred embodiment, the cutter basket has an opening at the bottom to allow the melon meat to fall directly into a bowl supported beneath the basket. This requires minimal labor and allows the meat to be separated from the melon without being touched further improving sanitation.

The present invention will be further appreciated in light of the following detailed description and drawings in which:

BRIEF DESCRIPTION OF THE DRAWINGS

FIG. 4 is an overhead plan view partially broken away of the present invention.

FIGS. 6A–6C is a plan view, partially broken away, of a mechanism used to hold the handle in position.

DETAILED DESCRIPTION

Figure 1:
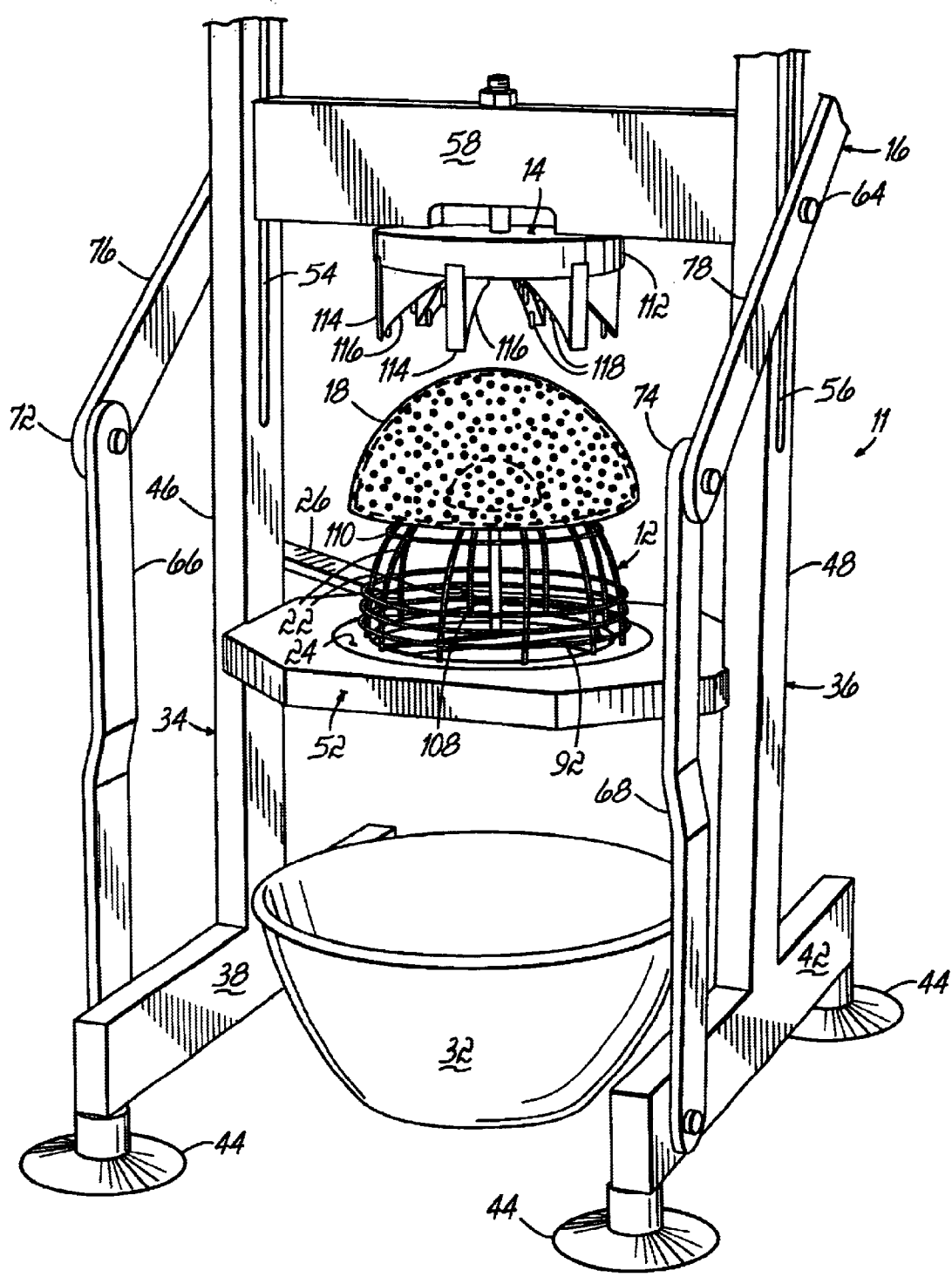
FIG. 1 is a perspective view partially broken away of the present invention.
Figure 2:
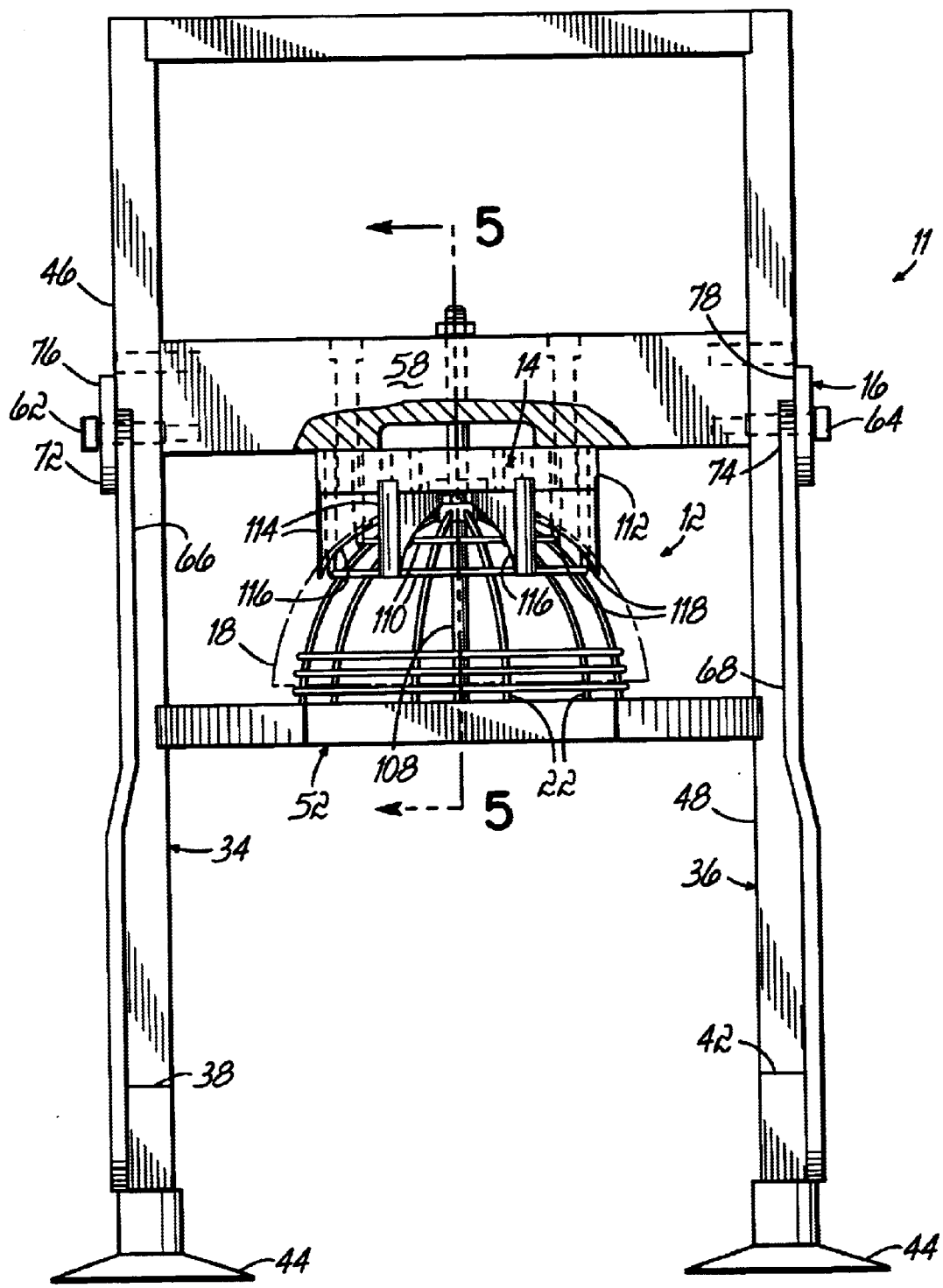
FIG. 2 is a front plan view partially broken away of the present invention.
Figure 3:
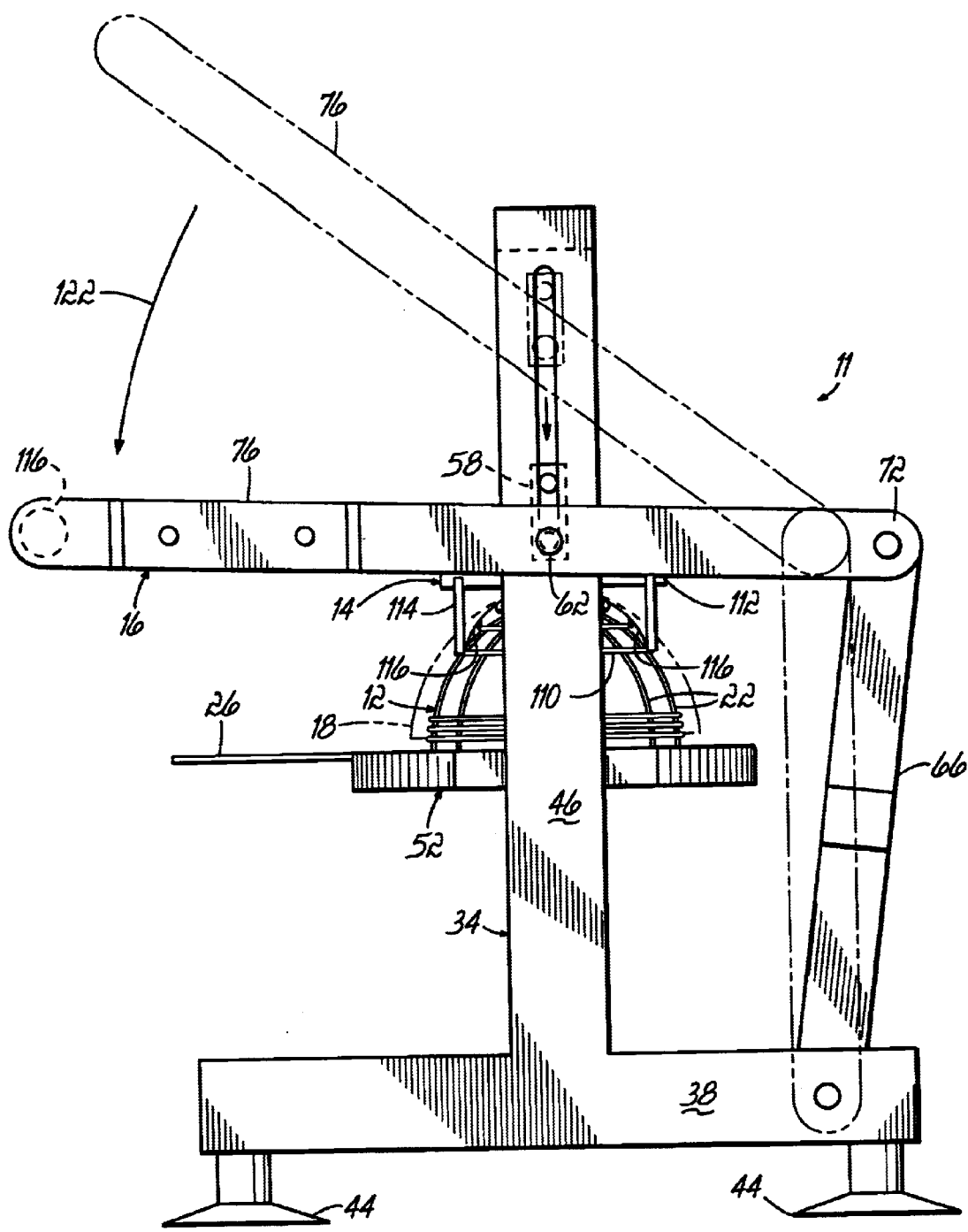
FIG. 3 is a side plan view of the present invention.
Figure 5:
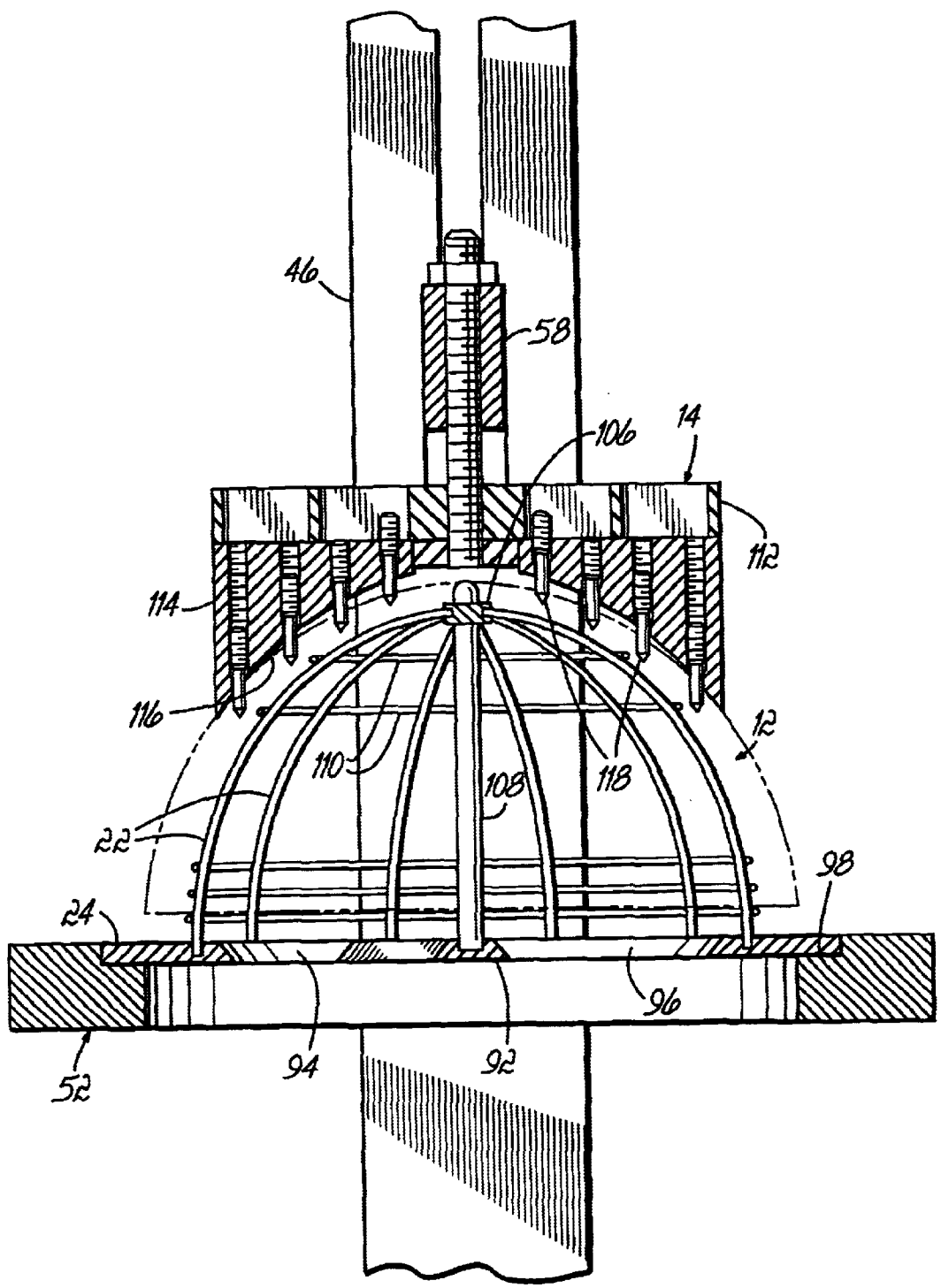
FIG. 5 is a cross-sectional view taken approximately along line 5—5 of FIG. 2.

As shown in FIG. 1, the present invention is a melon cutter 11 which includes a cutting basket 12 and a melon holder 14. The melon holder 14 is supported by a lever mechanism 16 which forces the melon holder 14 and any melon 18 down upon blades or cutting wires 22 of the cutting basket. The blades 22 are supported on a ring 24 having a handle 26. The blades 22 make a vertical cut into the melon. Rotating the basket makes horizontal cuts into the melon which separates the melon meat from the rind. This falls through opening 28 into a bowl 32.

More particularly the melon cutter 11 includes a left and right inverted t-shape frame members 34 and 36. The bottom elements 38 and 42 of t-frame members 34 and 36 include suction cup feet 44. Extending up from the base members 38 and 42 are vertical frame members 46 and 48. Supported between the vertical frame members 46 and 48 is a base plate 52 having central opening 28. Base plate 52 is preferably formed from high density polyethylene.

The vertical frame members each include a slot 54 and 56. A central beam 58 extends between members 46 and 48 and includes posts 62 and 64 extending through slots 54 and 56 respectively. The lever mechanism 16 acts to move the beam 58 up and down along slots 54 and 56 of vertical frame members 46 and 48.

The lever mechanism 16 includes left and right vertical links 66 and 68 which are pivotally connected at their bottom ends to frame members 38 and 42. The upper portion 72 and 74 of vertical links 66 and 68 attach to the left and right handle linkages 76 and 78.

As shown in FIG. 4, these handle linkages extend from the ends of the vertical linkage 72 and 74 and pivotally connect to posts 62 and 64 which extend into beam 58 through slots 54 and 56 respectively. The linkages are then bent towards each other and are welded together and form handle 86. Thus as handle 86 is moved up and down, it forces the beam 58 up and down riding in the two slots 54 and 56.

The cutting basket 12 is supported on base 52. More particularly the cutting basket includes ring 24 having a central support member 92 which extends across the ring 24. This leaves two open areas 94 and 96 on either side of the central support 92. The ring 24 rests on the base 52 in an annular groove 98 opening. Attached to the ring 24 is handle 26.

Extending from the ring 24 are the plurality of arched stainless steel cutting wires 22 which are welded at one end to the ring 24 and at the opposite end to a central ring 106 attached to a post 108 extended up from the central support 92. The cutting basket 12 may include one or more circular horizontal cutting elements 110 welded to the arched cutting wires 22. The three lower horizontal cutting elements provide strength to the basket 12.

The melon holder 14 which is immediately above the cutting basket includes a central plate 112 which is bolted to beam 58. The plate 112 holds a plurality of radially extended curved members 114. Extending down from the curved surface 116 of curved member 114 are a plurality of pointed posts 118. These are adapted to partially penetrate the melon rind, when the holder is forced down on the melon.

In operation, a melon is cut in half and the seeds and pulp removed. The melon half 18 is placed on the top of the cutting basket 12. The linkage handle is pressed downwardly as indicated by arrow 122 which will force the beam downwardly riding in slots 54 and 56. The pointed posts 118 will penetrate the melon rind and the curved members 114 of the melon holder will then force the melon half down against the arched cutting wires 22 of the cutting basket thereby cutting the melon meat. The handle 26 of the cutting basket is then rotated as shown by arrow 124 in FIG. 4. The rotating cutting elements separate the melon meat from the rind.

The melon segments thus separated from the melon rind will fall through the openings into a bowl located immediately below the base and between the t-frame members.

FIGS. 6A–6C show an optional mechanism to hold the handle in an upright position when not in use. In this embodiment, the vertical frame member has been modified so that slot 56 has an uppermost turned portion 126. Attached to handle linkage 78 is a linkage 128 which has a first 130 which includes a post 132 which rides in slot 56.

The second end of linkage is hingedly attached to the handle linkage 78 so that as shown in FIG. 6A, the handle is held in an upright position. In order to utilize the melon cutter, the handle 86 and handle linkage 78 is pushed upwardly in the direction of arrow 134 which causes the post to move from the turned in portion in slot 56 and allows it to ride down slot 56. The handle is then pushed in the direction of arrow 138 to cut the melon. This simply provides the ability to hold the handle in an upright position when not in use.

As shown, this permits the melon to be separated from the rind without touching the melon meat. Further, it is extremely quick and efficient thereby significantly reducing labor costs.

This has been a brief description of the present invention along with the preferred method of practicing the present invention. However, the invention itself should be defined by the appended claims.

Wherein I claim:

1. A melon cutter comprising a cutting basket having a plurality of arched cutting elements extending upwardly;
   a melon holder adapted to grasp the rind of a melon half;
   an arm adapted to force said holder and said cutting basket towards each other whereby a melon half held by said holder would be forced against and into said arched cutting elements;
   said cutting basket adapted to rotate relative to said melon holder thereby cutting and separating wedges of melon from said rind.

2. The melon cutter claimed in claim 1 wherein said cutting basket is open allowing melon pieces to fall below said cutting basket.

3. The melon cutter claimed in claim 2 wherein said cutting basket is supported on a base member said base member supported at a height permitting a bowl to be placed underneath the base member wherein said base has an opening beneath said cutting basket.

4. The melon cutter claimed in claim 1 wherein said holder has a plurality of spikes adapted to penetrate the rind of said melon.

5. The melon cutter claimed in claim 1 wherein said holder is connected to a beam which rides in a frame of said melon cutter.

6. The cutter claimed in claim 5 wherein said cutter includes an arm linkage adapted to force said beam and said holder down toward said cutting basket.

7. The melon cutter claimed in claim 3 wherein said cutting basket rests in an annular groove on said plate.

8. The melon cutter claimed in claim 7 wherein arched blades extend up to a central post support.

9. The melon cutter claimed in claim 1 further including at least one annular horizontal blade connected to said arched blades.

10. A melon cutter comprising a cutting head said cutting head having a ring and a plurality of arched cutting elements;
    a melon holder having a plurality of spikes adapted to penetrate the rind of a melon half, said holder supported by a frame of said melon cutter and connected to a linkage adapted to force said holder toward said cutting head;
    wherein said cutting head is supported by said frame on a base member;
    said ring including a handle and being adapted to rotate relative to said base member and said melon holder whereby a melon half placed between said cutting head and said melon holder can be forced down upon said cutting head thereby being penetrated by said arched cutting elements and whereby rotation of said handle of said cutting head separates melon segments from said melon permitting said melon segments to fall through said base member into a bowl below said base member.

* * * * *